United States Patent
Muramatsu

(10) Patent No.: US 8,407,899 B2
(45) Date of Patent: Apr. 2, 2013

(54) FLUID DYNAMIC BEARING, METHOD OF MANUFACTURING FLUID DYNAMIC BEARING, ROTATING DEVICE, AND DISK DRIVE DEVICE

(75) Inventor: Akira Muramatsu, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 584 days.

(21) Appl. No.: 12/702,174

(22) Filed: Feb. 8, 2010

(65) Prior Publication Data

US 2010/0247008 A1 Sep. 30, 2010

(30) Foreign Application Priority Data

Mar. 24, 2009 (JP) ................................. 2009-072818

(51) Int. Cl.
*B21D 53/10* (2006.01)

(52) U.S. Cl. .................. 29/898.02; 29/898.15; 384/100; 384/107

(58) Field of Classification Search .................... 29/898, 29/898.02, 898.04, 898.041, 898.07, 898.15, 29/465, 467, 530; 384/100, 107, 112, 121
See application file for complete search history.

(56) References Cited

U.S. PATENT DOCUMENTS

| 6,851,860 | B2 * | 2/2005 | Oelsch ........................... 384/107 |
| 7,102,851 | B2 * | 9/2006 | Asada et al. ................ 360/99.08 |
| 7,604,409 | B2 * | 10/2009 | Nishiyama et al. ........... 384/107 |
| 2006/0256469 | A1 * | 11/2006 | Nishiyama et al. ........ 360/99.08 |

FOREIGN PATENT DOCUMENTS

JP 2001-107946 4/2001

* cited by examiner

*Primary Examiner* — David Bryant
*Assistant Examiner* — Ryan J Walters
(74) *Attorney, Agent, or Firm* — Fulwider Patton LLP

(57) ABSTRACT

A fluid dynamic bearing includes a shaft to which a resin flange is fixed by insert molding. The process where the flange is fixed to the shaft by insert molding includes a flange forming process in which the flange, fixed to the shaft, is formed by injecting the resin into a filled portion in the lower mold through an upper mold, while cooling at least part of the shaft, arranged in a shaft arrangement portion in a lower mold, with cooling water circulating through a cooling pipe.

11 Claims, 5 Drawing Sheets

FLUID DYNAMIC BEARING, METHOD OF MANUFACTURING FLUID DYNAMIC BEARING, ROTATING DEVICE, AND DISK DRIVE DEVICE

CROSS-REFERENCE TO RELATED APPLICATION

This application is based upon and claims the benefit of priority from the prior Japanese Patent Application No. 2009-072818, filed on Mar. 24, 2009, the entire content of which is incorporated herein by reference

BACKGROUND OF THE INVENTION

1. Field of the Invention

The present invention relates to a fluid dynamic bearing, a method of manufacturing the fluid dynamic bearing, a rotating device, and a disk drive device, and in particular, to a technique for stabilizing the rotational accuracy of a rotating body.

2. Description of the Related Art

Recently, in disk drive devices such as HDDs (Hard Disk Drives), the rotational accuracy of a rotating body has been drastically improved by being supported with a fluid dynamic bearing provided in the disk drive device. The fluid dynamic bearing is provided with dynamic pressure grooves for generating dynamic pressure in part of the rotating body thereof, such as the shaft, so that dynamic pressure is generated by the interaction with a lubricant such as oil, which is filled around the rotating body, during the rotation of the rotating body. Through the generated dynamic pressure, the fluid dynamic bearing makes the rotating body substantially float in the lubricant during the rotation of the rotating body so that the rotating body is supported in a non-contact manner with ambient components. With such a background in which the bearing accuracy of the fluid dynamic bearing has been improved, the disk drive device has been required to have a higher density and a greater increased capacity for data to be stored. For example, in a disk drive device capable of reading/writing data magnetically, a recording disk on which recording tracks are formed is rotated at a high speed. The magnetic head executes the reading/writing data while tracing the recording tracks of the recording disk with a slight gap between both. Because the size of the recording disk used in such a disk drive device is limited, the width of the recording track has been required to be small in order to realize a substantial higher density and a greater increased capacity. In accordance with the width of the recording track, the gap between the magnetic head and the recording disk has also been required to be small.

With the realization of a higher density and a greater increased capacity, the disk drive devices have been mounted in various apparatuses. With such a trend, weight saving of the disk drive device has become an important issue. To deal with such a demand for the weight saving, it has been investigated whether components of a fluid dynamic bearing may be made of resins. For example, Japanese Patent Application Publication No. 2001-107946 discloses a fluid dynamic bearing whose flange is made of a resin, the flange having thrust dynamic pressure grooves for generating a dynamic pressure in the thrust direction, and a method of manufacturing the fluid dynamic bearing in which the flange is fixed to the shaft when the flange is molded.

However, when a resin flange with thrust dynamic pressure grooves is molded integrally with a shaft by the manufacturing method disclosed in Japanese Patent Application Publication No. 2001-107946, the perpendicularity between the flange and the shaft is not stabilized in many cases. That is, when one intends to mold a flange by filling the surrounding area of a shaft, the shaft being composed of a material different from a resin, with a high-temperature molten resin, the temperature of the shaft is increased from room temperature to, for example, one hundred and tens degrees Celsius, thereby causing the shaft to thermally expand. In this state, the flange is to be formed in accordance with the shape of the mold and fixed to the shaft. Thereafter, the boundary surface between the shaft and the resin contracts non-uniformly in the course where the temperature of the shaft returns to room temperature, thereby the flange is sometimes tilted. Because the contraction in this case varies in every molded article, the perpendicularity between the shaft and the flange also varies in every molded article. Such variation in the perpendicularity between the shaft and the flange causes surface fluctuation of the flange when rotated on the basis of the shaft. The surface fluctuation of the flange means the slope of the surface on which the thrust dynamic pressure groove has been formed. If a shaft with a flange, the surface of which is greatly tilted, is installed in a fluid dynamic bearing, the space between the tilted surface of the flange and the surface facing the tilted surface in the axial direction becomes disproportionate in accordance with the slope of the flange. The disproportion of the space also varies greatly in accordance with rotational movement. Because thrust dynamic pressure generated by rotation of the flange is decreased in the area where the space between the flange on which the thrust dynamic pressure grooves has been formed and the surface, facing the flange in the axial direction, is large whereas increased in the area where the space is small, the thrust dynamic pressure becomes disproportionate. Such disproportion of the thrust dynamic pressure may cause a disproportionate load in the radial bearing unit and may deteriorate the rotational accuracy of the shaft. In the disk drive device mounted with such a fluid dynamic bearing, the rotational accuracy of which is disproportionate, the disproportion of the rotational accuracy may deteriorate the error rate in reading/writing data when the width of the recording track is small. That is, there is a problem that the performance of the surface fluctuation of the flange eventually becomes an obstacle to a higher density and greater increased capacity disk drive device.

SUMMARY OF THE INVENTION

Accordingly, the present invention has been made to solve the aforementioned problem, and a purpose of the invention is to provide a fluid dynamic bearing capable of stabilizing the rotational accuracy thereof, the fluid dynamic bearing including a shaft molded integrally with a resin flange, and provide a method of manufacturing the fluid dynamic bearing.

In order to solve the abovementioned problem, a fluid dynamic bearing according to an embodiment of the present invention comprises: a shaft; a flange fixed to one end of the shaft; a shaft housing member configured to rotatably house at least part of the shaft; a flange housing space provided at one end of the shaft housing member and configured to rotatably house the flange; a counter plate configured to face the end surface of the flange in the axial direction and to seal the flange housing space; a radial dynamic pressure groove formed on at least either the shaft or the surface of the shaft housing member, facing the shaft in the radial direction; thrust dynamic pressure grooves provided on at least either the flange or the surface of the flange housing space, facing the flange in the thrust direction, and provided on at least either the flange or the surface of the counter plate, facing the flange in the thrust direction; and a lubricant filled in the radial dynamic pressure groove and the thrust dynamic pressure grooves. In the fluid dynamic bearing, the flange is fixed to the shaft by a resin insert molding method such that the amount of the surface fluctuation of the flange is less than or equal to 3 μm during its rotation.

The present inventors have obtained an experimental result that, when a shaft with the a flange for generating thrust dynamic pressure is rotated, if both the space between the upper surface of the flange and the surface facing the upper surface and the space between the lower surface of the flange and the surface facing the lower surface, are ensured to be greater than or equal to 5 μm, respectively, the desired thrust dynamic pressure can be generated without substantially being affected by the influence of dimensional errors of the components of which the spaces are composed. That is, the inventors have obtained the experimental result that, if the space, occurring when the rotation of the shaft with the flange is stopped such that the rotating body is left in a non-floating state (hereinafter, this space is referred to as the thrust space), is ensured to be greater than or equal to 10 μm, the desired thrust dynamic pressure can be obtained during its rotation. The inventors also have obtained an experimental result that, if the thrust space is greater than or equal to 30 μm, the generated dynamic pressure is small and it is difficult to obtain thrust dynamic pressure of a desired magnitude. The inventors also have obtained an experimental result that, if the amount of the surface fluctuation of the flange is made to be less than or equal to 3 μm when the thrust space is within the range of 10 μm to 30 μm, a stable thrust dynamic pressure can be obtained. As stated above, by controlling the amount of the surface fluctuation of the flange to be less than or equal to 3 μm, the stable rotational accuracy of a fluid dynamic bearing can be ensured.

Another embodiment of the present invention relates to a method of manufacturing a fluid dynamic bearing that comprises: a shaft; a flange fixed to one end of the shaft; a shaft housing member configured to rotatably house at least part of the shaft; a flange housing space provided at one end of the shaft housing member and configured to rotatably house the flange; a counter plate configured to face the end surface of the flange in the axial direction and to seal the flange housing space; a radial dynamic pressure groove formed on at least either the shaft or the surface of the shaft housing member, facing the shaft in the radial direction; thrust dynamic pressure grooves provided on at least either the flange or the surface of the flange housing space, facing the flange in the thrust direction, and provided on at least either the flange or the surface of the counter plate, facing the flange in the thrust direction; and a lubricant filled in the radial dynamic pressure groove and the thrust dynamic pressure grooves. The method of manufacturing a fluid dynamic bearing comprises forming the flange by fixing a resin to the shaft by insert molding while at least part of the shaft is being cooled.

The part of the shaft to be cooled can be an area of the shaft other than, for example, the joint area between the shaft and the flange. As a method of cooling the shaft, for example, a water cooling method, an air cooling method, or other cooling methods can be used. It is preferable that the part of the shaft to be cooled is maintained at, for example, a temperature close to normal temperature. It is preferable that the part to be cooled is maintained at a temperature of, for example, 20 to 70° C. The cooling temperature can be appropriately determined by experiment, etc. As a result, the thermal expansion of the shaft can be suppressed when a high-temperature resin is injected into the mold. That is, the change between the shapes of the shaft obtained when a resin is fixed to the shaft by insert molding and when the temperatures of the shaft and the flange return to a normal temperature, can be made small. In other words, the position of the flange when formed by the insert molding can be suppressed from being changed due to contraction, and therefore the position of the joint between the shaft and the flange, which is to follow the accuracy of the mold at the time of the insert molding, can be readily maintained. For example, the perpendicularity in the joint area between the shaft and the flange can be readily maintained. As a result, the amount of the surface fluctuation of a resin flange can be stably ensured to be less than or equal to, for example, 3 μm when the shaft with the resin flange is rotated.

Yet another embodiment of the present invention also relates to a method of manufacturing a fluid dynamic bearing that comprises: a shaft; a flange fixed to one end of the shaft; a shaft housing member configured to rotatably house at least part of the shaft; a flange housing space provided at one end of the shaft housing member and configured to rotatably house the flange; a counter plate configured to face the end surface of the flange in the axial direction and to seal the flange housing space; a radial dynamic pressure groove formed on at least either the shaft or the surface of the shaft housing member, facing the shaft in the radial direction; thrust dynamic pressure grooves provided on at least either the flange or the surface of the flange housing space, facing the flange in the thrust direction, and provided on at least either the flange or the surface of the counter plate, facing the flange in the thrust direction; and a lubricant filled in the radial dynamic pressure groove and the thrust dynamic pressure grooves. The method of manufacturing a fluid dynamic bearing comprises: forming the flange by fixing a resin to the shaft by insert molding; and adjusting the fixed position of the flange by pressing the flange in an adjusting mold after the flange has been fixed.

In the adjusting the fixed position of the flange, the position of the joint between the shaft and the flange can be made a desired position following the adjusting mold by pressing the shaft to which the flange has been fixed in the adjusting mold. For example, the position of the joint area between the shaft and the flange can be adjusted to be a right angle. As a result, the amount of the surface fluctuation of the flange can be suitably ensured to be, for example, less than or equal to 3 μm when the shaft with the resin flange is rotated. In the adjusting the fixed position of the flange, the adjusting mold can be heated to a temperature, for example, slightly lower than the glass transition temperature of the resin of which the flange is made. The position of the joint between the shaft and the flange can be readily corrected to be the position determined by the accuracy of the adjusting mold by pressing the shaft to which the flange has been fixed in the adjusting mold after heating the adjusting mold.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
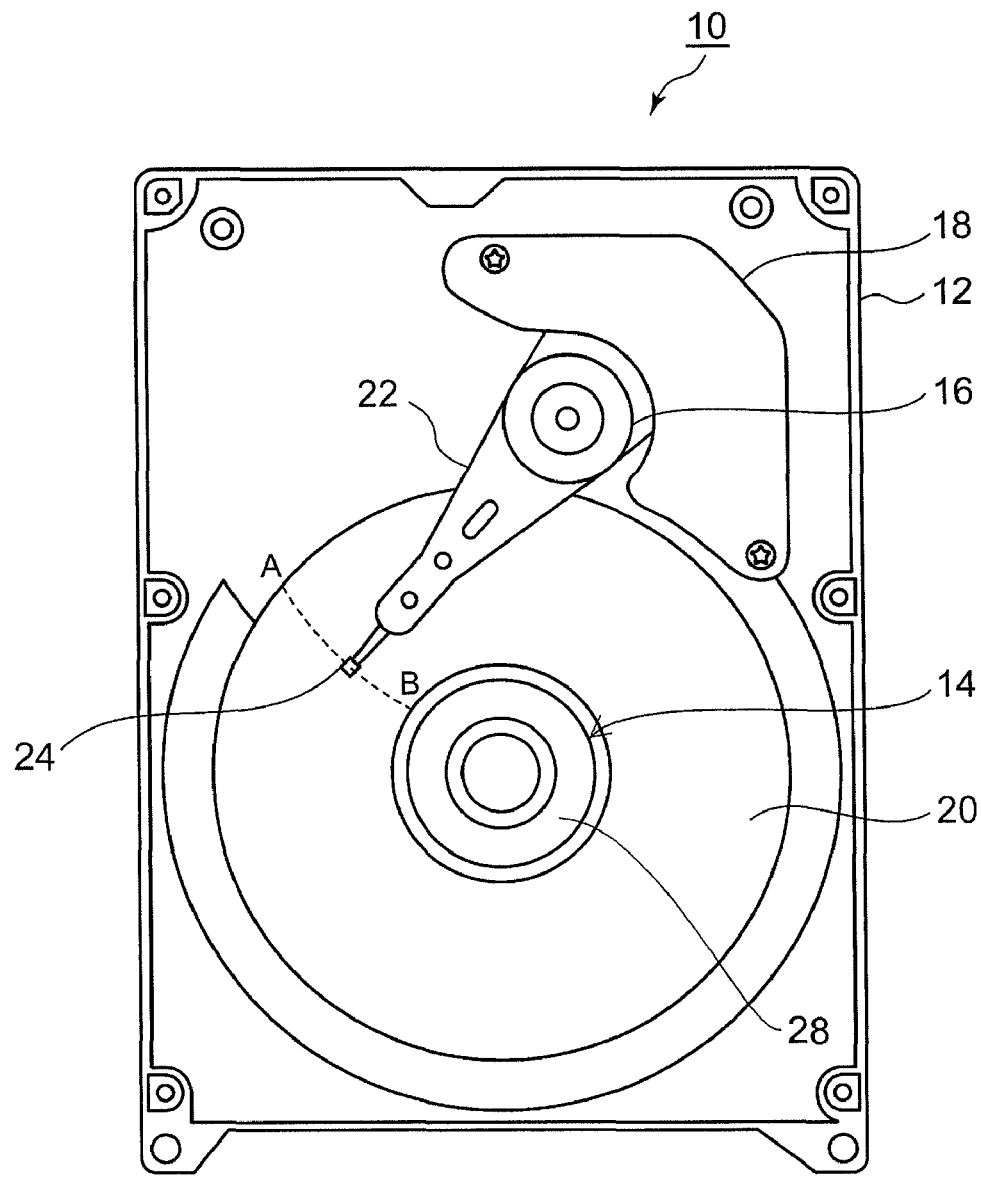
FIG. 1 is a schematic view illustrating the internal structure of a hard disk drive device, an example of a disk drive device including a fluid dynamic bearing according to the present embodiment.

Hereinafter, the preferred embodiments of the present invention will be described based on the accompanying drawings. FIG. 1 is a schematic view illustrating the internal structure of a hard disk drive device (HDD) 10, an example of a disk drive device including a fluid dynamic bearing according to the present embodiment. FIG. 1 illustrates a state where a cover is removed in order to expose the internal structure.

A brushless motor 14, an arm bearing unit 16, a voice coil motor 18, etc., are mounted on the upper surface of a base member 12. The brushless motor 14 may be, for example, a spindle motor with twelve slots and eight magnetized poles. The brushless motor 14 rotationally drives a recording disk 20 on which data can be recorded, for example, magnetically. The brushless motor 14 is driven by a three-phase drive current consisting of a U-phase, a V-phase, and a W-phase. The arm bearing unit 16 supports, in a swing-free manner, a swing arm 22 within a movable range AB. The voice coil motor 18 makes the swing arm 22 swing in accordance with external control data. A magnetic head 24 is fixed to the tip of the swing arm 22. When the HDD 10 is in an operation state, the magnetic head 24 moves, with a swing of the swing arm 22, above the surface of the recording disk 20 with a slight gap between them and within the movable range AB, thereby reading/writing data. In FIG. 1, point A corresponds to the position of the outermost circumferential recording track of the recording disk 20, and point B corresponds to the position of the innermost circumferential recording track thereof. The swing arm 22 may be moved to the waiting position provided in the side of the recording disk 20 when the HDD 10 is in a stopped state.

A hub member 28, which is rotated by the brushless motor 14, is exposed at the position slightly shifted in the longitudinal direction from the approximate center of the base member 12. The HDD 10 is structured to include a fixed body portion, a rotating body portion, and a bearing unit that supports both in a relatively rotatable manner. In the present embodiment, the structure, including all of the components for reading/writing data such as the recording disk 20, the swing arm 22, the magnetic head 24, and the voice coil motor 18, is sometimes expressed as the disk drive device or sometimes as the HDD 10. Or, only the components for rotationally driving the recording disk 20 are sometimes expressed as the disk drive device.

Figure 2:
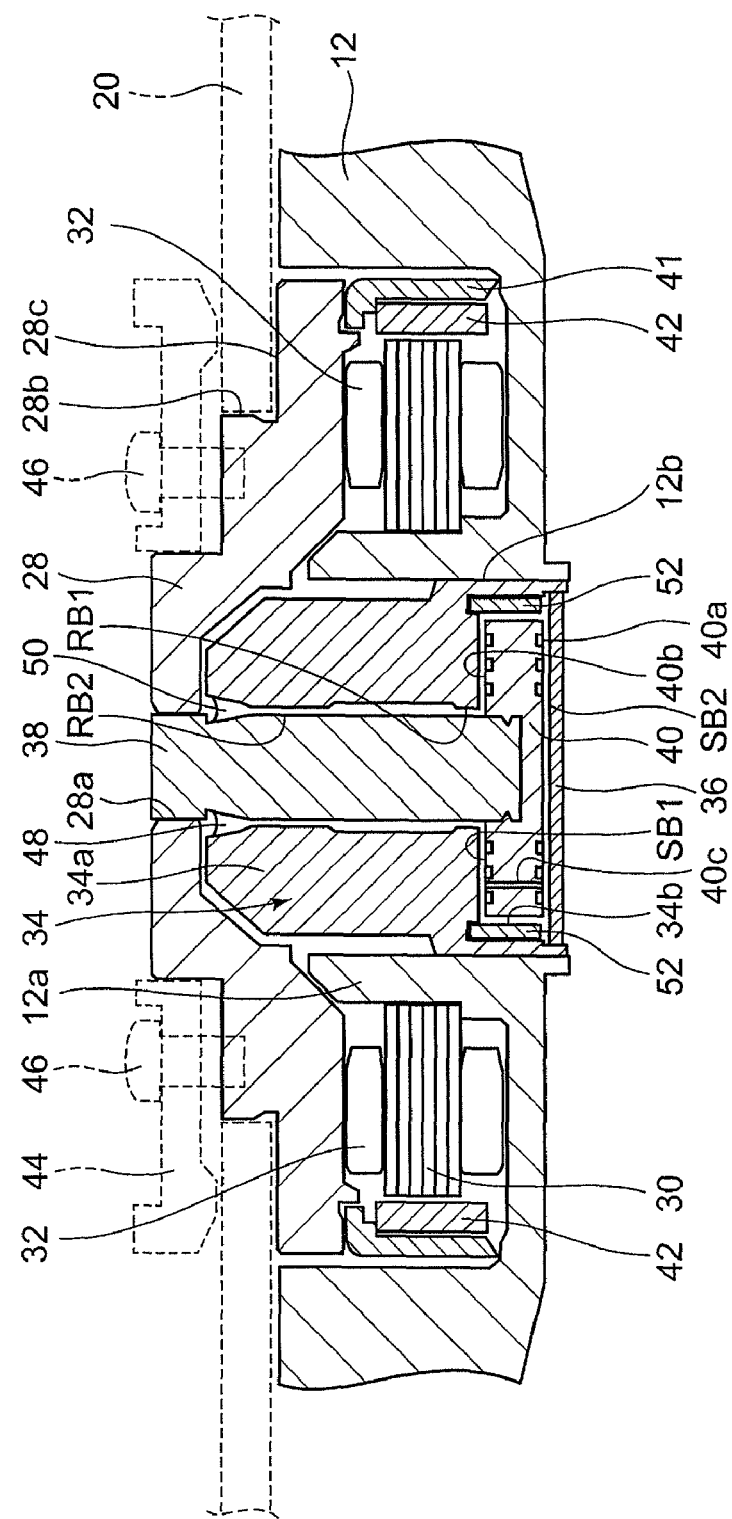
FIG. 2 is an explanatory view illustrating the details of a fixed body portion, a rotating body portion, and a bearing unit of the disk drive device according to the present embodiment.

Details of the fixed body portion, the rotating body portion, and the bearing unit will be described with reference to FIG. 2. FIG. 2 illustrates the structure of a so-called shaft-rotation-type disk drive device in which the hub member 28 supporting the recording disk 20 and a shaft 38, which will be described later, are integrally rotated.

The fixed body portion comprises the base member 12, a stator core 30, and a drive coil 32. The base member 12 serves also as the housing of the HDD 10. The stator core 30 is fixed to the outer wall surface of a cylinder portion 12a formed on the base member 12. The stator core 30 is structured by laminating electromagnetic steel plates and is provided with, for example, twelve teeth located at the same intervals along the circumference of the stator core 30, the teeth extending outward radially. The drive coil 32 is a three-phase coil wounded around the teeth of the stator core 30. A three-phase current having an approximate sine-wave shape is conducted through the drive coil 32 by a predetermined drive circuit such that a rotational magnetic field is generated. An approximately cylindrical-shaped sleeve 34, serving as a housing member, is fixed to a housing hole 12b formed on the base member 12. The sleeve 34 is structured with a shaft housing member 34a rotatably housing at least part of the shaft 38. A flange housing space portion 34b, rotatably housing a flange 40 fixed to one end of the shaft 38, is formed on one end of the shaft housing member 34a. In the present embodiment, the flange housing space portion 34b is structured as part of the shaft housing member 34a with which the sleeve 34 is structured. A disk-shaped counter plate 36 is fixed to one end of the sleeve 34, thereby sealing the flange housing space portion 34b as well as sealing the inside of the base member 12 in which the recording disk 20, etc., is housed.

Subsequently, the rotating body portion will be described. The rotating body portion functions as a rotating member and is structured to include the hub member 28, the shaft 38, the flange 40, a yoke 41, and a magnet 42. One end of the shaft 38 is fixed to a central hole 28a formed on the hub member 28, and the disk shaped flange 40 is fixed to the other end of the shaft 38.

The hub member 28 is a disk-shaped member and the ring-shaped yoke 41, concentric with the cylinder portion 12a and extending in the axial direction of the shaft 38, is fixed to the outer circumferential edge portion of the hub member 28. The cylindrical magnet 42 is fixed to the inner wall surface of the yoke 41 with an adhesive, etc. The magnet 42 is formed of, for example, an Nd—Fe—B (Neodymium-Iron-Boron) rare earth material, and on the surface thereof an anti-corrosion treatment is performed by electro-deposition coating or spray coating, etc. In the present embodiment, the magnet 42 has, for example, eight driving magnetic poles along the circumferential direction thereof and on the inner circumference side thereof. The driving magnetic poles of the magnet 42 generates a rotational drive force by the interaction with the rotational magnetic field generated by the drive of the drive coil 32 of the stator core 30, so that the rotating body portion is rotated.

The hub member 28 has an outer tubular portion 28b and an outward extension portion 28c jointed with the outer tubular portion 28b and extending outwards in the radial direction. For example, the inner circumferential portion of the recording disk 20 with an approximate doughnut shape and a diameter of 3.5 inches (approximately 89 mm), is engaged with the outer tubular portion 28b and mounted on the outward extension portion 28c. A clamper 44 with an approximate doughnut shape is mounted on the recording disk 20 and is fixed to the hub member 28 with a screw 46. Thereby, the recording disk 20 is fixed to the hub member 28. The hub member 28 can be formed by molding or machining a metal such as aluminum and iron, or a conductive resin.

Subsequently, the bearing unit will be described. A radial dynamic pressure generating portion structured with a pair of herringborn-shaped radial pressure grooves RB1 and RB2, vertically spaced from each other in the axial direction of the shaft 38, are formed on the inner circumference of the sleeve 34. A radial fluid dynamic bearing is structured with the radial dynamic pressure generating portion and a lubricant, which will be described later. The radial dynamic pressure groove RB2 on the side close to the open end of the sleeve 34 is arranged at a level greater than or equal to the axial height of the surface on which the recording disk 20 supported by the outward extension portion 28c is mounted. With the radial dynamic pressure groove RB2 arranged on such a level, there is an effect that the hub member 28 is stably supported by a dynamic pressure during its rotation. The sleeve 34 can be formed by cutting a copper metal or a stainless steel. Alternatively, the sleeve 34 may be formed by molding with the use of a conductive resin into which, for example, a conductive filler such as carbon fiber is kneaded.

In addition, a first thrust space is formed with the counter plate 36 and the surface 40a of the flange 40. A second thrust space is formed with the end of the sleeve 34, that is, the wall surface of the flange housing space portion 34b on the shaft housing member 34a side, and with the surface 40b of the flange 40 facing the aforementioned wall surface. A thrust dynamic pressure generating portion, structured with herringborn-shaped or spiral-shaped thrust dynamic pressure grooves SB1 and SB2, is formed on the surfaces 40a and 40b of the flange 40. A thrust fluid dynamic bearing is structured with the thrust dynamic pressure generating portion and the lubricant, which will be described later.

Disk drive devices have been mounted in various apparatuses, and hence weight saving becomes an important issue. Therefore, in the present embodiment, the weight saving of a disk drive device can be realized by making the flange 40 with the thrust dynamic pressure groves SB1 and SB2 for generating thrust dynamic pressure, with a resin.

A capillary seal portion 48 is structured with the open end of the sleeve 34, in which the space between the inner circumference of the sleeve 34 and the outer circumference of the shaft 38 gradually extends toward the outward of the capillary seal portion 48. The space including the radial dynamic pressure grooves RB1 and RB2 and the thrust dynamic pressure grooves SB1 and SB2, and the space from the bottom to the middle of the capillary seal portion 48, are filled with a lubricant 50 such as oil. The radial dynamic pressure generation portion including the radial dynamic pressure grooves RB1 and RB2, and the thrust dynamic pressure generating portion including the thrust dynamic pressure grooves SB1 and SB2, communicate with each other by a non-illustrated circulation pathway formed on part of the sleeve 34 and the inner circumferential surface thereof, etc., so that the lubricant 50 can freely circulate through each dynamic pressure generating portion. In addition, a through-hole 40c penetrating the surfaces 40a and 40b of the flange 40 is provided, and the lubricant 50 can also circulate freely though the hole.

Foreign substances, such as wear powder or a fragment of a bearing component, sometimes float in the lubricant 50. In particular, when the flange 40 is made of a resin, the probability that wear powder or a fragment thereof may be present is increased. If theses foreign substances are present in the lubricant 50, the wear of the bearing component may be accelerated, or rotational non-uniformity or rotational failure of the shaft 38 may be caused. Accordingly, in the present embodiment, the sleeve 34 is provided with a porous filter 52 in order to remove the foreign substances floating in the lubricant 50. The porous filter 52 can be provided in, for example, the flange housing space portion 34b located near the outer circumference of the flange 40. Because the lubricant 50 flows, at the position, from the flange 40 toward the outward in the radial direction during the rotation of the flange 40, the foreign substances occurring in the flange 40 can be effectively removed.

It is preferable that the porous filter 52 is made of, for example, a polypropylene non-woven fabric and has at least a double-layered structure consisting of a first layer and a second layer. In this case, the diameter of the first layer of the porous structure is larger than that of the second layer thereof. The present inventors have obtained an experimental result that the diameters of the foreign substances floating in the lubricant 50 in a disk drive device can be classified into three categories including small foreign substances with a diameter less than 0.3 µm, middle foreign substances with a diameter of 0.3 to 1.0 µm, and large foreign substances with a diameter greater than 1.0 µm. In addition, the inventors also have obtained an experimental result that the small foreign substances rarely become an obstacle even if they enter the space in the bearing, and therefore it is preferable to effectively capture the middle foreign substances and the large foreign substances. In this case, if the size of the whole porous structure is made to be approximately 0.3 µm, all foreign substances are captured and accumulated near the surface of the porous filter 52, and accordingly, the filter is clogged at an early stage. Therefore, when the size of the holes of the first layer of the porous structure, the first layer being close to the surface of the porous structure, is made to be, for example, 0.5 to 1.0 µm, only the large foreign substances are captured and accumulated with the middle foreign substances passing through the first layer. Further, when the size of the holes of the second layer thereof, the second layer being remote from the surface thereof, is made to be, for example, 0.3 to 0.5 µm, the middle foreign substances are thus captured. That is, the foreign substances can be captured by using the whole porous filter 52, allowing for the whole porous filter to effectively function as a filter and allowing for the porous filter to be used for a longer time before the porous filter stops working due to clogging. The porous structure of the porous filter 52 is not limited to a double-layered structure, but may have a multi-layered structure with three or more layers or may have a structure in which the size of the holes is continuously changed. Thereby, foreign substances can be removed more effectively.

The material or the shape of the porous filter 52 can be appropriately changed, which can provide the same effect. The place where the porous filter 52 is arranged is not limited to the aforementioned embodiment, but may be arranged in any place where the lubricant 50 flows, which can provide the same effect.

When the shaft 38 of which the rotating body portion is composed is rotated by the rotational magnetic field generated with the drive coil 32 in the stator core 30 driven, the radial dynamic pressure grooves RB1 and RB2 generate radial dynamic pressure in the lubricant 50, supporting the rotating body including the hub member 28 in the radial direction. Further, when the flange 40 is rotated along with the shaft 38, the thrust dynamic pressure grooves SB1 and SB2 generate thrust dynamic pressure in the lubricant 50, supporting the rotating body including the hub member 28 in the thrust direction. The through-hole 40c has a function to stabilize the floating position or the floating state of the flange 40 by adjusting the pressure difference between both surfaces of the flange 40. In addition, the capillary seal portion 48 functions as a seal member for preventing the leakage of the lubricant 50, which occurs when an excessive amount of the lubricant 50 moves to the space formed between the hub member 28 and the sleeve 34 by capillarity.

As stated above, the flange 40 according to the present embodiment is made of a resin, and accordingly weight saving thereof can be realized. When the flange 40 is to be fixed to the shaft 38, the fixation of the flange 40 can be realized by, for example, insert molding. By forming the flange 40 by the insert molding, the thrust dynamic pressure grooves SB1 and SB2 can be molded simultaneously with the molding of flange 40, allowing the manufacturing efficiency to be improved. The insert molding means a molding method in which a component to be embedded in a resin article (for example, the shaft 38) is placed within the mold in advance and the mold is filled with the resin by injection, etc.

It is desirable that the flange to be fixed to the shaft is fixed at a right angle to the axial direction of the flange. If the flange is tilted towards the shaft, which occurs when the flange is fixed to the shaft at an angle other than at a right angle, the surface of the flange on which the thrust dynamic pressure grooves are formed fluctuates in the axial direction of the flange during the rotation of the flange, that is, a so-called surface fluctuation phenomenon occurs. As a result, the thrust dynamic pressure generated in the thrust dynamic pressure groove fluctuates.

Figure 3A:
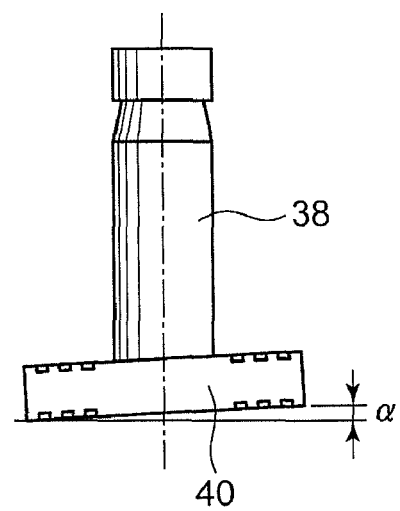
FIGS. 3A through 3C are explanatory views illustrating that the perpendicularity of the joint portion between a flange and a shaft is deteriorated when the flange is fixed to the shaft by insert molding.
Figure 3B:
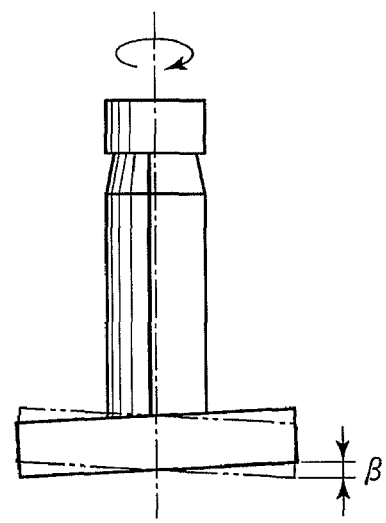

FIGS. 3A thorough 3C are explanatory views illustrating that the perpendicularity of the joint portion between the flange 40 and the shaft 38 is deteriorated when the flange 40 is fixed to the shaft 38 by insert molding. According to a specific experimental example, when the flange is molded by injecting a resin, which has been molten at approximately 400° C., into the mold in which the shaft 38 has been arranged, the temperature of the shaft 38 is also increased. In this experiment, the shaft 38 was made of SUS 420J2 and the diameter thereof was approximately 4 mm. In this case, the temperature of the shaft 38 was increased from room temperature (20° C.) to approximately 170° C. Because the coefficient of linear expansion of SUS 420J2 is $10.3 \times 10^{-5}$/° C., the diameter of the shaft 38 thermally expanded by approximately 5 to 6 μm with the increase in the temperature. If the shaft 38 that is thermally expanded as stated above is insert molded by injecting a resin, the boundary surface with the resin contracts non-uniformly in the course where the temperature of the shaft 38 returns to room temperature, causing a deformation. Thereby, the perpendicularity between the shaft 38 and the flange 40 is deteriorated with the flange 40 that is tilted as illustrated in FIG. 3A. When the shaft 38 with the flange 40 affixed thereto in an tilted state, as illustrated, is rotated, the surface fluctuation of the flange 40 occurs as illustrated in FIG. 3B. In this case, the amount of the surface fluctuation β was found to be 6 to 10 μm when measured. The surface fluctuation of the flange 40 means the slope of the surface on which the thrust dynamic pressure grooves SB are formed. If the flange 40, the surface of which is greatly tilted, is installed in a fluid dynamic bearing, the space with the surface facing the flange in the axial direction is disproportionate in accordance with the slope, i.e., disproportionate by approximately 10 μm on one side in this case. The disproportionate amount varies greatly in accordance with the rotation. The thrust dynamic pressure generated by the rotation of the flange 40 is decreased in the area where the space between the flange 40 on which the thrust dynamic pressure grooves have been formed and the surface, facing the flange 40 in the axial direction, is large whereas increased in the area where the space is small. Accordingly, the thrust dynamic pressure becomes disproportionate. If the amount of the surface fluctuation is large, the disproportionate amount of the space becomes large with the rotation of the flange 40, causing the disproportionate amount of the thrust dynamic pressure to be large. That is, the flange is rotated in a state where the thrust dynamic pressure is large on one side of the flange 40 whereas small on the other side thereof. As a result, disproportionate loads may be caused in the radial bearing unit and the rotational accuracy of the shaft may be deteriorated.

Figure 3C:
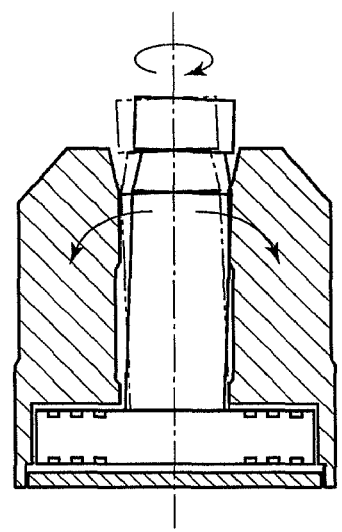

The fluctuation of the thrust dynamic pressure as stated above causes unbalance rotation of the shaft 38 as illustrated in FIG. 3C, i.e., causes disproportionate rotation of the recording disk 20 such that the error rate in reading/writing data is deteriorated.

Accordingly, in the present embodiment, the acceptable range of the amount of the surface fluctuation of the flange 40 will be found when the flange 40 is to be fixed to the shaft 38 by insert molding. Further, a manufacturing method will be presented in which the amount of the surface fluctuation of the shaft 38 with the flange 40, molded by insert molding, is within the acceptable range.

The acceptable range of the amount of the surface fluctuation will be at first described. A dynamic pressure is not generated during the non-rotation of the flange 40, and the flange 40 moves to, for example, the counter plate 36 side by the gravity, causing the surface 40*a* of the flange 40 to be in contact with the counter plate 36. That is, the space in the first thrust space is in a state of zero. The space in the second thrust space (hereinafter, referred to as the thrust space) has been designed to be 20 μm in this state.

When the flange 40 is rotated, dynamic pressure is generated by the thrust dynamic pressure grooves SB1 and SB2. Of the dynamic pressures, one generated in the area where the space is smaller is larger than that generated in the area where the space is larger. Accordingly, the dynamic pressure in the first thrust space is larger, thereby the flange 40 staring floating and being stabilized at the level where the dynamic pressure on both surfaces of the flange 40 and the gravity are equal to each other. In this state, the case where the space in the first thrust space and that in the second thrust space are approximately equal to each other is preferable in terms of rarely being affected by the dimension error of components of which the thrust space is composed.

The present inventors have obtained an experimental result that, when the thrust spaces is below 10 μm, the spaces in the first thrust space and the second thrust space are approximately 5 μm during the rotation, respectively, and the variation in the dynamic pressures is large by being affected by the dimension error of the components of which the thrust space is composed. The inventors have also obtained an experimental result that, on the other hand, when the thrust space exceeds 40 μm, more specifically, exceeds 30 μm, the dynamic pressure is small. Accordingly, the inventors have reached a conclusion that it is preferable that the thrust space is 15 to 30 μm.

A fluid dynamic bearing will be taken into consideration in which the flange 40 of the fluid dynamic bearing, the thrust space of which is 15 to 30 μm, is made of a resin and fixed to the shaft 38 by insert molding. As stated above, in the structure in which the surface fluctuation of the flange 40 is 6 to 10 μm, there is the problem that the rotational accuracy is deteriorated as a fluid dynamic bearing. As a result of experiments where the amounts of the surface fluctuation have been changed to various values, the inventors have obtained a result that, in the structure in which the thrust space is 15 to 30 μm, by making the amount of the surface fluctuation of the flange 40 less than or equal to 3 μm, the rotational accuracy of the flange 40 satisfies, as a fluid dynamic bearing, the requisite condition of a disk drive device, and the variation in the surface fluctuation are within the acceptable range.

Therefore, in the fluid dynamic bearing in which the thrust space is 15 to 30 μm, the stable rotational accuracy of a fluid dynamic bearing can be ensured by controlling the acceptable range of the amount of the surface fluctuation of the flange 40 to be less than or equal to 3 μm.

Subsequently, a manufacturing method for joining the shaft 38 and the flange 40 by insert molding such that the amount of the surface fluctuation is within the aforementioned acceptable range, will be described.

Figure 4A:
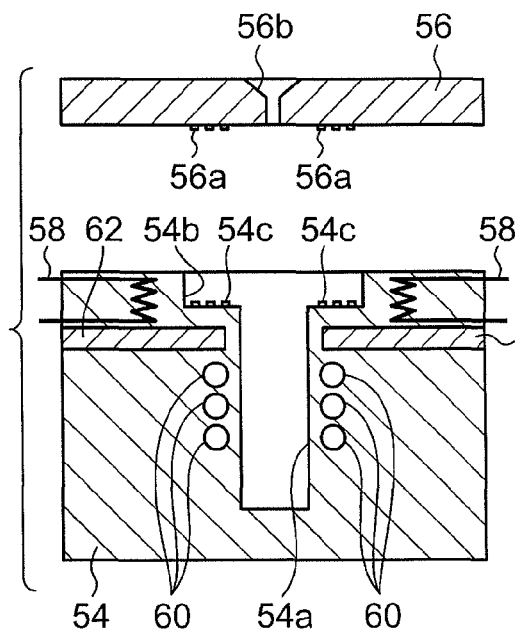
FIGS. 4A through 4D are explanatory views of a flange-molding process in which a flange of the fluid dynamic bearing according to the present embodiment is fixed to a shaft by insert molding.

FIGS. 4A through 4D are explanatory views of a flange-molding process in which the flange 40 according to the present embodiment is fixed to the shaft 38 by insert molding. FIG. 4A illustrates a mold for the injection molding, which is composed of a lower mold 54 and an upper mold 56. The lower mold 54 is provided with a shaft arrangement portion 54a, a space where the shaft 38 is arranged, and a filled portion 54b in which the resin with which the flange 40 is molded is injection-filled. On the surface of the filled portion 54b on the side of the shaft arrangement portion 54a, a plurality of convex portions 54c are provided in order to mold the thrust dynamic pressure grooves SB1 of the flange 40. In the area surrounding the filled portion 54b in the lower mold 54, an electric heater 58 is embedded.

A cooling pipe 60 through which a cooling medium circulates is embedded, as a cooling means, in the area surrounding the shaft arrangement portion 54a in the lower mold 54. Increase in the temperatures of the shaft arrangement portion 54a and the shaft 38, which is placed in the mold, can be suppressed by circulating, for example, cooling water through the cooling pipe 60. As a cooling medium, for example, a cooling gas, etc., is also available other than cooling water. A heat insulating layer 62 is provided between the area surrounding the filled portion 54b and the area surrounding the shaft arrangement portion 54a. Both the cooling pipe 60 and the heat insulating layer 62 have a function to effectively suppress an increase in the temperature of the shaft arrangement portion 54a.

On the other hand, a plurality of convex portions 56a for molding the thrust dynamic pressure grooves SB2 are provided on the surface of the upper mold 56, the surface being in contact with the filled portion 54b in the lower mold 54. An injection port 56b for filling the filled portion 54b with a molten resin is provided in the area corresponding to the approximately central area of the surface of the upper mold 56, the surface being in contact with the filled portion 54b. As a resin used for molding the flange 40, for example, a polyetherimide resin, a polyimide resin, a polyamide resin, polyacetal, polybutylene terephthalate (PBT), a liquid crystal polymer (LCP), polyether ether ketone (PEEK), a polyphenylene sulfide resin (PPS), etc., can be used.

Figure 4B:
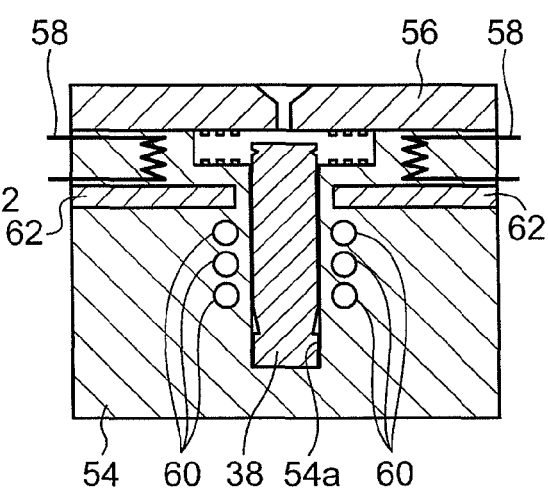

FIG. 4B illustrates a state where the upper mold 56 is pressurized to close both the upper mold 56 and the lower mold 54 after arranging the shaft 38 in the shaft arrangement portion 54a in the lower mold 54. In this state, the area surrounding the filled portion 54b in the lower mold 54 is heated to, for example, 170° C. by powering the electric heater 58. The present inventors have obtained an experimental result that: it is not preferable that the heating temperature is below 150° C. because the injected resin is rapidly cooled such that short mold may occur; and also, it is not preferable that the heating temperature exceeds 220° C. because the deformation of the resin is large when the resin has contracted. That is, the inventors have obtained an experimental result that it is preferable that the heating temperature is set to a temperature that is lower than the glass transition temperature of a resin to be used by approximately 20 to 70° C. in terms of stabilizing its shape.

In this case, an increase in the temperature of the shaft 38, arranged in the shaft arrangement portion 54a in the lower mold 54, is suppressed by the actions of the cooling water in the cooling pipe 60 and the heat insulating layer 62, thereby the thermal expansion of the shaft 38 being suppressed to a small value. The temperature is increased by, for example, 30° C. in this case. If a martensitic stainless steel such as SUS 420J2, which has been quenched, is used as a material of the shaft 38, a tempering phenomenon occurs when heated to 180° C. or more, thereby the hardness thereof being decreased. The hardness of the shaft 38, which has been HRC 52 when quenched, is decreased to approximately HRC 49 when gradually cooled after being heated to 200° C. If the hardness of the shaft 38 has been decreased in this way, the shaft 38 becomes weak in wear strength, possibly causing the life thereof to be shortened. Accordingly, if a material such as a stainless steel, which has been quenched, is used for the shaft 38, another effect can be obtained in which a decrease in the hardness of the shaft 38 can be reduced by the actions of the cooling water in the cooling pipe 60 and the heat insulating layer 62.

Figure 4C:
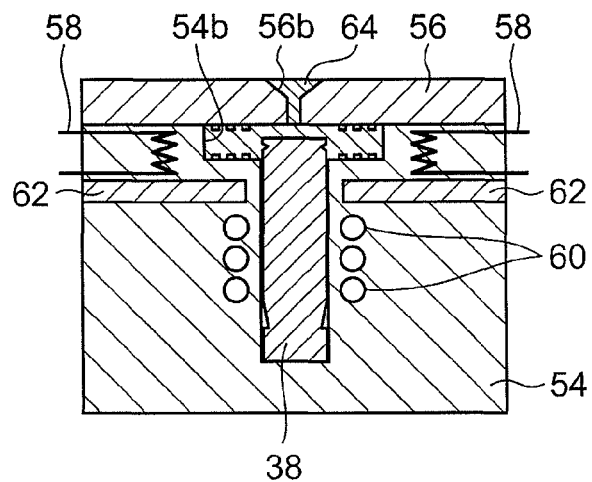
Figure 4D:
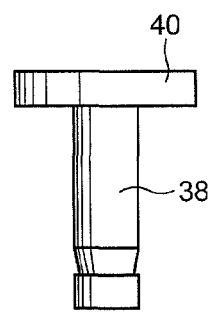

Subsequently, a resin 64 is injected into the injection port 56b as illustrated in FIG. 4C. For example, a polyetherimide resin whose glass transition temperature is 217° C., which has been molten by being heated to 400° C., is injected into the injection port 56b toward the filled portion 54b. As illustrated in FIG. 4C, concave-shaped hollows are formed at the edge of the shaft 38 on the side to which the flange 40 is fixed. These concave-shaped hollows function as a falling-out prevention portion that prevents the insert-molded flange 40 from falling out from the shaft 38. Thereafter, the shaft 38 to which the flange 40 is fixed, as illustrated in FIG. 4D, is taken out from the lower mold 54 after transporting the upper mold 56.

As illustrated in the present embodiment, an increase in the temperature of the shaft 38 can be suppressed by controlling the temperature of the shaft 38 when insert-molded, by using the cooling pipe 60 and the heat insulating layer 62. As a result, deterioration of the accuracy of the flange 40, such as the perpendicularity thereof, occurring due to the deformation caused by the thermal expansion of the shaft 38, can be suppressed, allowing for a shaft 38 with a flange 40, the dimension accuracy of which follows the accuracy of the lower mold 54 and the upper mold 56 and is within the design-acceptable range, to be molded. As stated above, because the perpendicularity of the flange 40 can be readily secured, the amount of the surface fluctuation of the flange 40 can be readily made less than or equal to 3 m when the molded shaft 38 is rotated.

FIGS. 5A through 5D are explanatory views illustrating a method of molding a shaft 38 with a flange 40 by another manufacturing method.

Figure 5A:
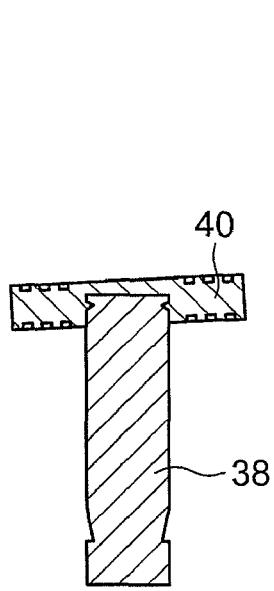
FIGS. 5A through 5D are explanatory views illustrating a molding method in which the perpendicularity of the shaft with the flange is secured by a manufacturing method different from that in FIGS. 4A through 4D.

As illustrated in FIG. 5A, the flange 40 is at first fixed to the shaft 38 with a polyetherimide resin, etc., by insert molding. This process is a flange-molding process. In the insert molding in this process, the shaft 38 needs not to be cooled as stated above, but the insert molding can be performed by a usual way. Accordingly, the shaft 38 with the flange 40 can be molded readily and efficiently without using a special lower mold 54. In this state, however, there is a possibility that the perpendicularity of the joint portion between the flange 40 and the shaft 38 may be deteriorated and the degree of the deterioration thereof varies for every molded article, by the influence of the thermal expansion of the shaft 38 and the contraction thereof after the thermal expansion, as stated above.

Figure 5B:
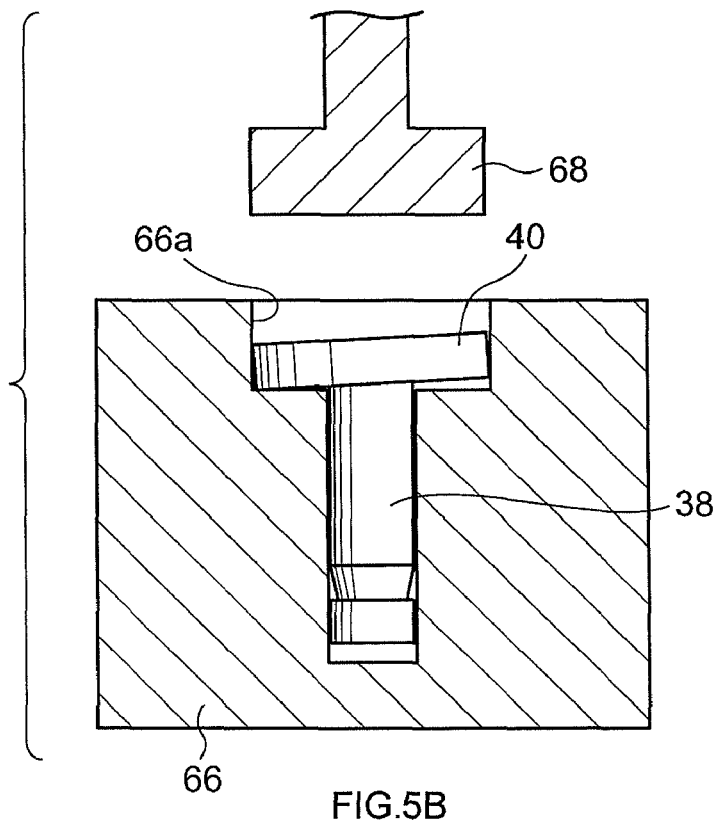
Figure 5C:
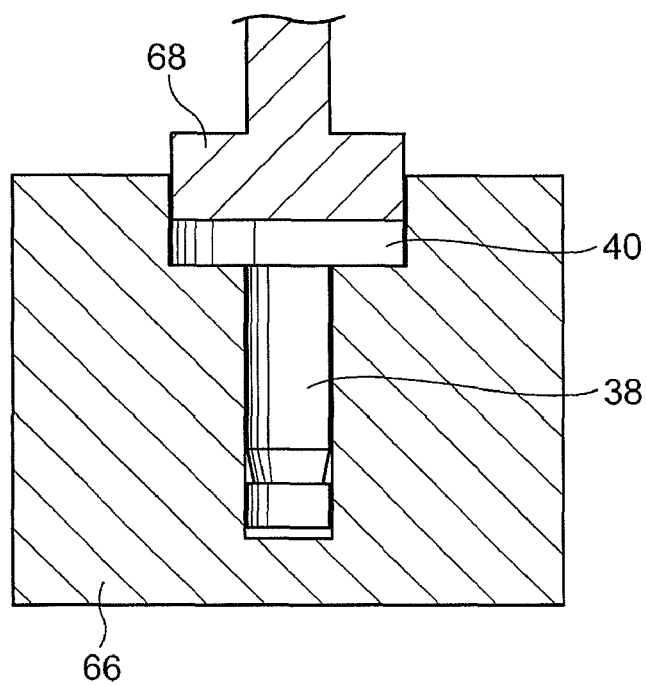
Figure 5D:
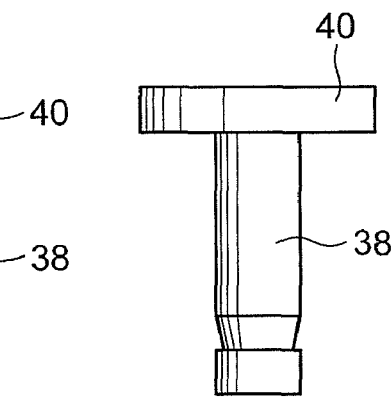

In the present embodiment, as stated above, the fixed position of the flange 40 in the shaft 38 with the flange 40, the perpendicularity of which is deteriorated, is adjusted in the adjustment process illustrated in FIGS. 5B and 5C. As illustrated in FIG. 5B, the shaft 38 with the flange 40, molded in the flange-molding process, is arranged in a correction room 66a in a press lower mold 66. In this case, the press lower mold 66 has been heated to a temperature slightly lower than the glass transition temperature of the resin of which the flange 40 is made, for example, to approximately 160 to 170° C. In this state, a press upper mold 68, a pressing mold, is transported toward the correction room 66a in the press lower mold 66, as illustrated in FIG. 5C, so that the flange 40 is pressurized and pressed with, for example, approximately 400 kg/cm$^2$. After the pressing state has been held for, for example, approximately 10 seconds, the shaft 38 with the flange 40 is gradually cooled to approximately 120° C. along with the press lower mold 66, and further rapidly cooled to room temperature. Thereafter, the shaft 38 with the flange 40 is taken out after removing the press upper mold 68. By pressing the shaft 38 in this way, the slope of the flange 40 is corrected so as to follow the shape of the press lower mold 66 and the press upper mold 68, as illustrated in FIG. 5D. Namely, the perpendicularity can be improved. According to the experiment conducted by the inventors, the amount of the surface fluctuation of the flange 40 in a molded article, the amount of the surface fluctuation being greater than or equal to 4 μm when rotated on the basis of the shaft 38 before the press, can be made less than or equal to 3 μm after the adjustment process by the press. The same result as that of the aforementioned embodiment can be obtained by heating the press lower mold 66 to a temperature near the glass transition temperature of the resin of which the flange 40 is made. Accordingly, it is also preferable to heat the press lower mold 66 to a temperature slightly higher than the glass transition temperature of a resin of which the flange 40 is made or to heat that to the glass transition temperature thereof.

Because the press lower mold 66 mechanically makes a right angle with the press upper mold 68, the perpendicularity between the flange 40 and the shaft 38 can be readily corrected if the plane by which the flange 40 is pressed. In this case, it is not necessary to adjust the angle between the flange 40 and the shaft 38 before the correction, and hence there is an advantage that the workability can be enhanced. In addition, the planes of the press lower mold 66 and the press upper mold 68, by which the flange 40 is pressed, can be structured such that concavities and convexities, corresponding to the thrust dynamic pressure grooves SB formed on the flange 40, are molded on the planes. In this case, the thrust dynamic pressure grooves SB can be formed in a state where the perpendicularity between the shaft 38 and the flange 40 are secured. As a result, the positional accuracy of the thrust dynamic pressure grooves SB relative to the flange 40 and that relative to the shaft 38 can be readily secured, allowing for the rotational accuracy of the disk drive device to be improved.

Based on experiments, etc., the present inventors have obtained results that, when the temperature of the press lower mold 66 exceeds the glass transition temperature of a resin of which the flange 40 is made, deformation occurs in the groove areas, and that, when the temperature thereof is lower than the aforementioned glass transition temperature by 100° C. or more, the effect of the correction becomes small. Accordingly, the inventors have obtained a result that it is preferable that the temperature of the press lower mold 66 is within the range lower than the glass transition temperature by 20 to 70° C. The inventors also have obtained a result that it is preferable that the holding time is greater than or equal to five seconds because the effect of the correction is small when the holding time is less than or equal to one second. The inventors also have obtained a result that, when the pressing pressure of the press upper mold 68 is set to approximately 200 to 500 kg/cm$^2$, a satisfactory effect of the correction and satisfactory workability can be obtained, although the pressing by the press upper mold 68 can be performed when the pressing pressure is within the range of 50 to 600 kg/cm$^2$.

It is confirmed that the aforementioned effect of the correction varies depending on the temperature of the press lower mold 66, the holding time, and the pressing pressure. Accordingly, it is preferable to seek an optimal point between the effect of the correction and the workability by adjusting the temperature, the holding time, and the pressing pressure.

The aforementioned gradual cooling, rapid cooling, and the time should not be limited to the aforementioned embodiment, but may be appropriately changed in accordance with the characteristic of a molded article.

The present inventors have learned through the experiments that: in the fluid dynamic bearing in which the flange 40 is made of a resin and fixed to the shaft 38 by insert molding, when the mutual separation force between the flange 40 and the shaft 38 is less than or equal to 600 N, the impact resistance as a fluid dynamic bearing is deteriorated; on the other hand, when the mutual separation force between both is ensured to be greater than or equal to 900 N, the aforementioned problem regarding the impact resistance can be solved. In the present embodiment, the structure for ensuring the pulling-out force between the flange 40 and the shaft 38 to be greater than or equal to 900 N can be realized by adjusting the type of the resin and molding conditions; however, the inventors also have learned that a satisfactory result can be obtained by combining with the molding process, such as by suppressing the thermal expansion of the shaft 38 when insert molded. The structure for ensuring the pulling-out force between the flange 40 and the shaft 38 to be greater than or equal to 900 N, can be maintained even in the case where the flange 40 is corrected by the aforementioned pressing after the flange 40 has been fixed to the shaft 38.

When taking into consideration the impact resistance of a disk drive device, it is more preferable that the flange 40 and the shaft 38 are structured such that the mutual separation force between both is ensured to be greater than or equal to 1000 N.

In addition, in the fluid dynamic bearing in which the flange 40 is made of a resin and fixed to the shaft 38 by insert molding, when the coefficients of linear expansion of the flange 40 and the shaft 38 differ greatly from each other, there is a problem that a space or a crack occurs in the boundary surface between both in the course of returning from a high temperature at the injection molding to room temperature, and thereby the dimension accuracy or the impact resistance may be deteriorated due to the occurrence of the surface fluctuation of the flange 40. Accordingly, in the present embodiment, a polyetherimide resin whose composition has been adjusted such that the coefficient of linear expansion thereof is approximately equal to that of the shaft 38, is used as a resin of which the flange 40 is made. For example, when the shaft 38 is made of SUS 420J2 whose coefficient of linear expansion is $10.3 \times 10^{-6}$/° C., the flange 40 is made of a polyetherimide resin whose composition has been adjusted such that the coefficient of linear expansion thereof is 7 to $14 \times 10^{-6}$/° C., and fixed to the shaft 38 by insert molding.

In the aforementioned case, when the flange 40 is made of a polyetherimide resin whose composition has been adjusted such that the coefficient of linear expansion thereof is 9 to $11 \times 10^{-6}$/° C. and fixed to the shaft 38 by insert molding, the surface fluctuation of the flange 40 can be further suppressed, allowing for the dimensional accuracy to be improved.

By mixing a conductive material such as carbon fiber with a resin to be used for molding the flange 40, for example, a polyetherimide resin, the conductive flange 40 can be made. In this case, an effect can be obtained in which the static electricity generated in a disk drive device can be readily discharged to the base member 12 side.

By employing a fluid dynamic bearing including a resin flange 40, the perpendicularity between the flange 40 and the shaft 38 being secured as described in the present embodiment, in a brushless motor 14, the weight of the brushless motor 14 can be saved. The fluid dynamic bearings described in the present embodiment can be used in various rotating devices besides brushless motors, thereby the effects of improving the rotational accuracy and saving the weight, which are the same as in the present embodiment, can be obtained. It is noted that the rotating devices include a disk drive device.

By mounting the motor described in the present embodiment in a disk drive device, the error rate can be made small, and accordingly, higher density and greater increased capacity of data can be realized in addition to the weight saving of the disk drive device.

The present invention shall not be limited to the aforementioned embodiments, and various modifications, such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A method of manufacturing a fluid dynamic bearing comprising:
   a shaft;
   a flange fixed to one end of the shaft;
   a shaft housing member configured to rotatably house at least part of the shaft;
   a flange housing space provided at one end of the shaft housing member and configured to rotatably house the flange;
   a counter plate configured to face the end surface of the flange in the axial direction and to seal the flange housing space;
   a radial dynamic pressure groove formed on at least either the shaft or the surface of the shaft housing member, facing the shaft in the radial direction;
   thrust dynamic pressure grooves provided on at least either the flange or the surface of the flange housing space, facing the flange in the thrust direction, and provided on at least either the flange or the surface of the counter plate, facing the flange in the thrust direction; and
   a lubricant filled in the radial dynamic pressure groove and the thrust dynamic pressure grooves, the method of manufacturing a fluid dynamic bearing comprising:
   forming the flange by fixing a resin to the shaft by insert molding while at least part of the shaft is being cooled.

2. The method of manufacturing a fluid dynamic bearing according to claim 1, wherein, in the forming the flange, the part of the shaft to which the flange is fixed by insert molding is heated to a temperature lower than the glass transition temperature of the resin of which the flange is made by 20 to 70° C.

3. The method of manufacturing a fluid dynamic bearing according to claim 1, wherein the heat conduction from the flange to the part of the shaft to which the flange is fixed by insert molding is suppressed by insulating an area between the part of the shaft to which the flange is fixed and the part of the shaft to be cooled.

4. The method of manufacturing a fluid dynamic bearing according to claim 1, wherein the thrust dynamic pressure grooves are formed when the flange is fixed to the shaft by insert molding.

5. The method of manufacturing a fluid dynamic bearing according to claim 1, wherein the resin is fixed to the shaft by insert molding such that the amount of the surface fluctuation of the flange is less than or equal to 3 µm during its rotation.

6. The method of manufacturing a fluid dynamic bearing according to claim 1, wherein the coefficient of linear expansion of the resin of which the flange is made is the same as that of the shaft.

7. A method of manufacturing a fluid dynamic bearing comprising:
   a shaft;
   a flange fixed to one end of the shaft;
   a shaft housing member configured to rotatably house at least part of the shaft;
   a flange housing space provided at one end of the shaft housing member and configured to rotatably house the flange;
   a counter plate configured to face the end surface of the flange in the axial direction and to seal the flange housing space;
   a radial dynamic pressure groove formed on at least either the shaft or the surface of the shaft housing member, facing the shaft in the radial direction;
   thrust dynamic pressure grooves provided on at least either the flange or the surface of the flange housing space, facing the flange in the thrust direction, and provided on at least either the flange or the surface of the counter plate, facing the flange in the thrust direction; and
   a lubricant filled in the radial dynamic pressure groove and the thrust dynamic pressure grooves, the method of manufacturing a fluid dynamic bearing comprising:
   forming the flange by fixing a resin to the shaft by insert molding; and
   adjusting the fixed position of the flange by pressing the flange in an adjusting mold after the flange has been fixed wherein, in the adjusting the fixed position of the flange, the adjusting mold is heated to a temperature slightly lower than the glass transition temperature of the resin of which the flange is made.

8. The method of manufacturing a fluid dynamic bearing according to claim 7, wherein, in the adjusting the position of the flange, the shaft and the flange are gradually cooled to approximately 120° C. and further more rapidly cooled to room temperature, after the fixed position of the flange has been adjusted.

9. The method of manufacturing a fluid dynamic bearing according to claim 7, wherein the thrust dynamic pressure grooves are formed when the fixed position of the flange is adjusted.

10. The method of manufacturing a fluid dynamic bearing according to claim 7, wherein the fixed position of the flange is adjusted such that the amount of the surface fluctuation of the flange is less than or equal to 3 µm during its rotation after the resin has been fixed to the shaft by insert molding.

11. The method of manufacturing a fluid dynamic bearing according to claim 7, wherein the coefficient of linear expansion of the resin of which the flange is made is the same as that of the shaft.

* * * * *